(12) United States Patent
Zhao (10) Patent No.: US 12,427,533 B2
(45) Date of Patent: Sep. 30, 2025

(54) FLUIDIC OSCILLATOR FOR A NOZZLE ASSEMBLY FOR ENHANCED COLD PERFORMANCE

(71) Applicant: DLHBOWLES, INC., Canton, OH (US)

(72) Inventor: Chunling Zhao, Columbia, MD (US)

(73) Assignee: ABC TECHNOLOGIES INC. (CA)

( * ) Notice: Subject to any disclaimer, the term of this patent is extended or adjusted under 35 U.S.C. 154(b) by 0 days.

(21) Appl. No.: 18/544,638

(22) Filed: Dec. 19, 2023

(65) Prior Publication Data

US 2024/0116061 A1 Apr. 11, 2024

Related U.S. Application Data

(63) Continuation of application No. 17/073,909, filed on Oct. 19, 2020, now Pat. No. 11,872,574.

(60) Provisional application No. 62/916,869, filed on Oct. 18, 2019.

(51) Int. Cl.
*B05B 1/08* (2006.01)
*B05B 1/04* (2006.01)

(52) U.S. Cl.
CPC . *B05B 1/08* (2013.01); *B05B 1/04* (2013.01)

(58) Field of Classification Search
CPC .... B05B 1/08; B05B 1/04; B05B 1/10; B05B 3/14; B05B 1/34; B05B 1/3478; B60S 1/46; B60S 1/52; B60S 1/56; F15C 1/22; F15C 1/00; G01D 5/44; Y10T 137/2185; Y10T 137/2087; Y10T 137/2104; Y10T 137/2109

USPC .................................................. 239/589.1
See application file for complete search history.

(56) References Cited

U.S. PATENT DOCUMENTS

| | | | |
|---|---|---|---|
| 4,055,302 A | 10/1977 | Hruby, Jr. | |
| 6,240,945 B1 | 6/2001 | Srinath et al. | |
| 6,253,782 B1* | 7/2001 | Raghu | F15C 1/22 |
| | | | 137/809 |
| 2019/0071057 A1* | 3/2019 | Kluge | B60S 1/52 |

FOREIGN PATENT DOCUMENTS

| | | |
|---|---|---|
| JP | 54500011 A | 8/1979 |
| JP | 2015515891 A | 6/2015 |

* cited by examiner

*Primary Examiner* — Arthur O. Hall
*Assistant Examiner* — Juan C Barrera
(74) *Attorney, Agent, or Firm* — McDonald Hopkins LLC (57) ABSTRACT

Provided is a fluidic oscillator circuit for a nozzle assembly configured to generate oscillating sprays of fluid from an outlet of the nozzle assembly and to improve spray performance of fluid having low temperatures or high viscosity. In one embodiment, provided is an interaction region for a fluidic oscillator circuit that includes an apex protrusion shaped to assist with generating vortices within the interaction region. In another embodiment, provided is an interaction region for a fluidic oscillator having a power nozzle that includes at least one finger protrusion that lengthens the power nozzle to create jets of fluid in the interaction region that are less diffused to improve cold performance of the fluidic oscillator circuit.

8 Claims, 11 Drawing Sheets

FLUIDIC OSCILLATOR FOR A NOZZLE ASSEMBLY FOR ENHANCED COLD PERFORMANCE

CROSS REFERENCE TO RELATED APPLICATIONS

This application is a continuation of U.S. patent application Ser. No. 17/073,909 filed Oct. 19, 2020 and title, "FLUIDIC OSCILLATOR FOR A NOZZLE ASSEMBLY FOR ENHANCED COLD PERFORMANCE," which claims priority to and the benefit of U.S. Provisional Patent Application No. 62/916,869 filed on Oct. 18, 2019 and titled, "FLUIDIC OSCILLATOR FOR A NOZZLE ASSEMBLY FOR ENHANCED COLD PERFORMANCE" each of which are incorporated by reference in their entireties.

FIELD OF INVENTION

The present disclosure generally relates to fluidic oscillators and nozzle assemblies and methods of making the same to produce an oscillating flow of fluid therefrom. More particularly, this disclosure relates to a fluidic oscillator that can operate at the colder temperatures usually associated with higher viscosity fluids.

BACKGROUND

Fluidic oscillators are well known in the prior art for their ability to provide a wide range of liquid spray patterns by cyclically deflecting a liquid jet. The operation of most fluidic oscillators is characterized by the cyclic deflection of a fluid jet without the use of mechanical moving parts. Consequently, an advantage of fluidic oscillators is that they are not subject to the wear and tear which adversely affects the reliability and operation of other spray devices.

Examples of fluidic oscillators may be found in many patents, including U.S. Pat. No. 3,185,166 (Horton & Bowles), U.S. Pat. No. 3,563,462 (Bauer), U.S. Pat. No. 4,052,002 (Stouffer & Bray), U.S. Pat. No. 4,151,955 (Stouffer), U.S. Pat. No. 4,157,161 (Bauer), U.S. Pat. No. 4,231,519 (Stouffer) which was reissued as RE 33,158, U.S. Pat. No. 4,508,267 (Stouffer), U.S. Pat. No. 5,035,361 (Stouffer), U.S. Pat. No. 5,213,269 (Srinath), U.S. Pat. No. 5,971,301 (Stouffer), U.S. Pat. No. 6,186,409 (Srinath) and U.S. Pat. No. 6,253,782 (Raghu). Each of these references as well as the references discussed throughout this application below are incorporated by reference herein in their entireties.

For the spraying of some high viscosity liquids (i.e., 15-20 centipoise), the "mushroom oscillator" disclosed in U.S. Pat. No. 6,253,782 (Raghu) and shown in FIG. 2 has been found to be especially useful. Raghu describes extensively the theory of operation and its dimensional characteristics and it has been the dominant production choice for a number of years, producing a heavy ended spray distribution with acceptable cold performance in methanol based fluids at 0° F. However, over the years, the requirements for spray distribution and cold performance have increased, as the temperatures the nozzle assemblies are expected to perform in have dropped and additional fluid bases have been introduced. Methanol based fluids are slowly being replaced with ethanol based or isopropyl based fluids. These fluids, at cold temperatures, have significantly higher viscosities than the methanol based fluids of the past. Minor improvements to the foundational geometry of fluidic oscillator circuits have been proposed and adopted as described in U.S. Pat. Nos. 7,267,290 and 7,472,848. Both attempt to create additional instability in the jets in higher viscosity fluids, helping the circuit to establish a robust oscillation.

Figure 1:
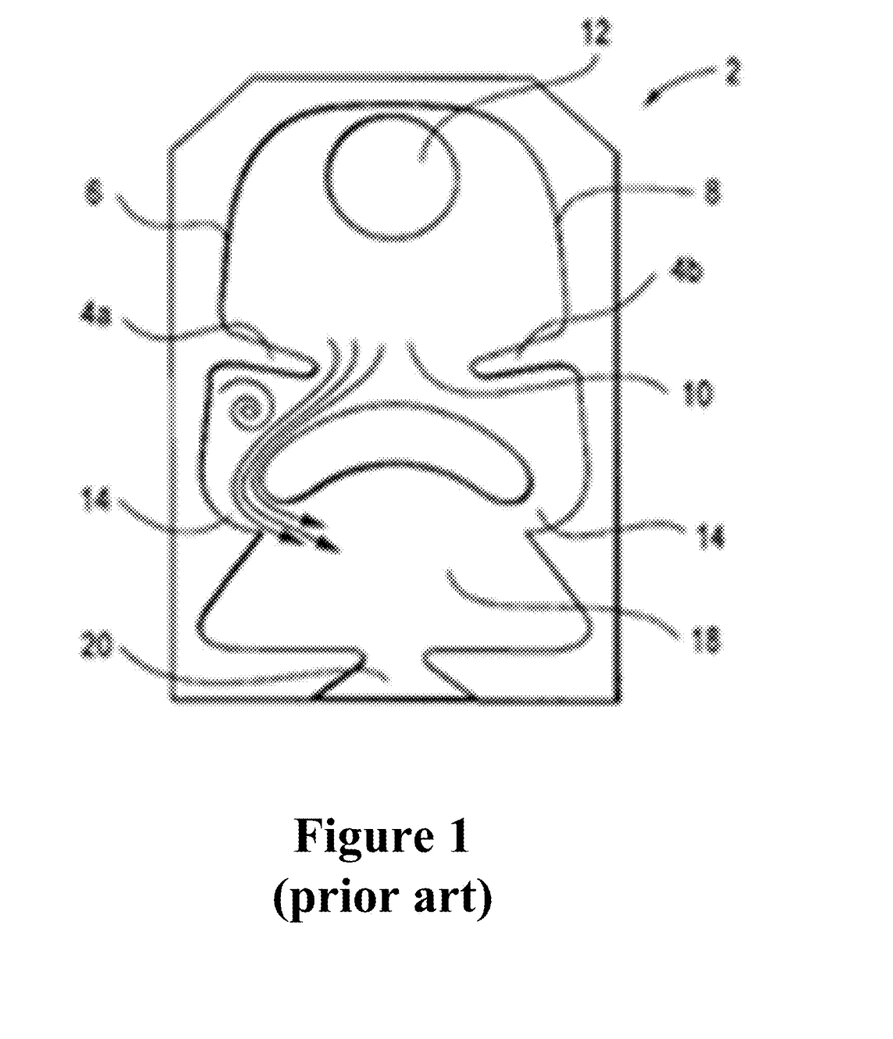
FIG. 1 is a front view of a mushroom style fluidic oscillator circuit of the prior art.
Figure 2:
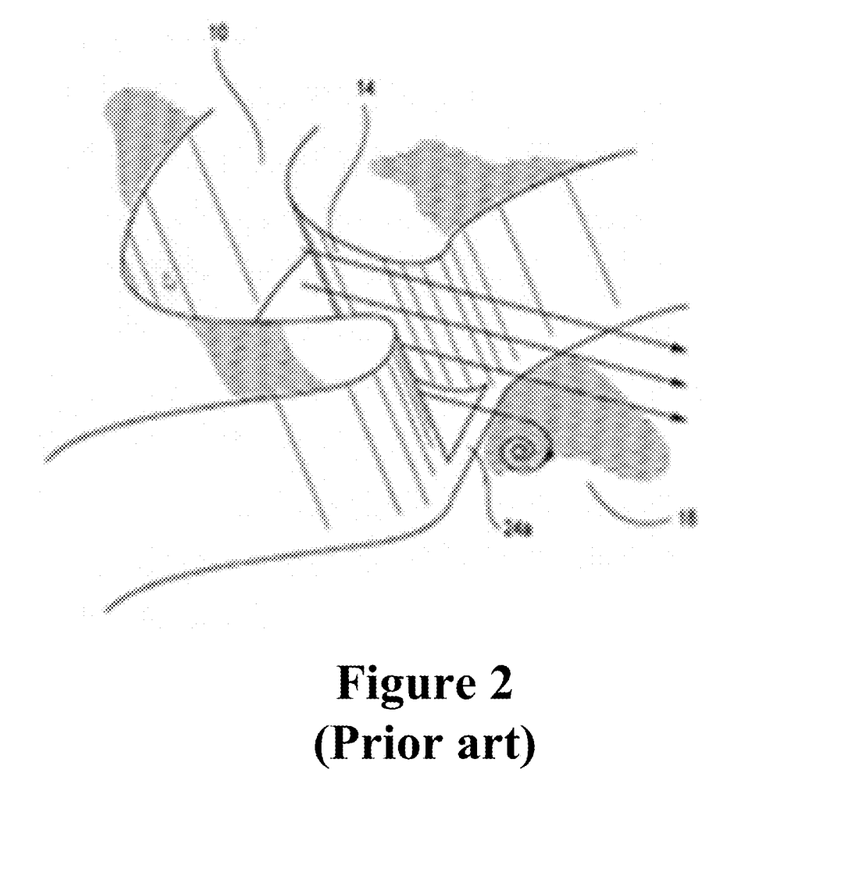
FIG. 2 is an enlarged schematic view of a fluidic oscillator circuit of the prior art.
Figure 3:
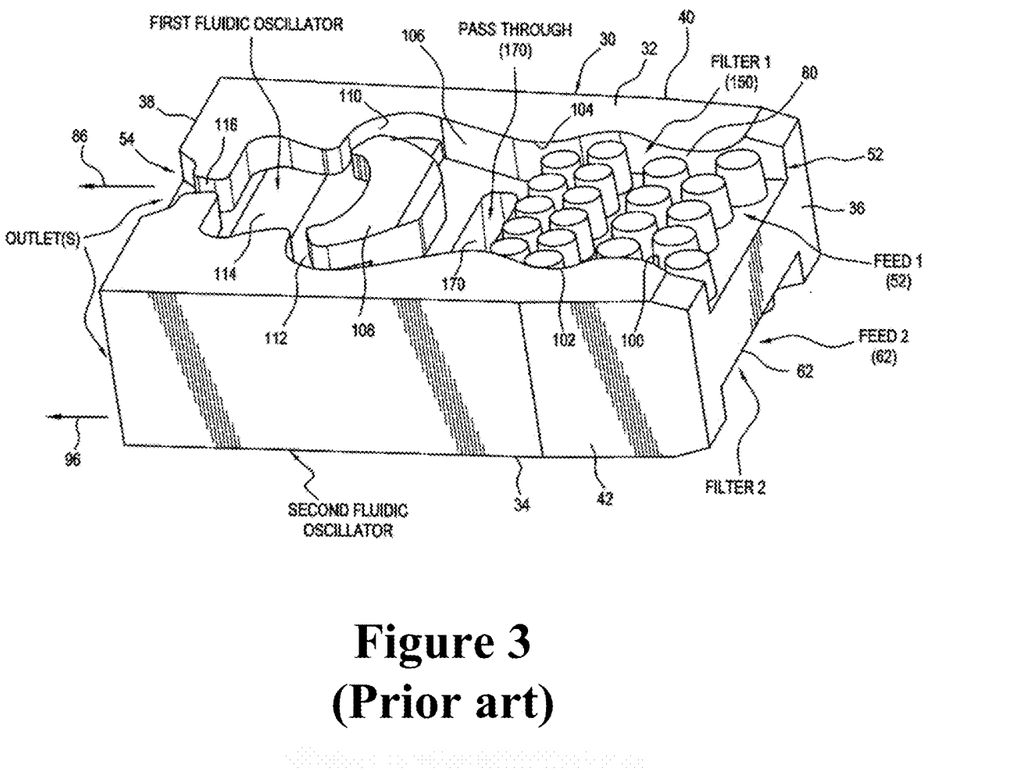
FIG. 3 is an enlarged view of a fluidic oscillator chip of the prior art with a plurality of filter posts.

FIG. 1 illustrates an embodiment from U.S. Pat. No. 7,267,290 that teaches to incorporate a finger like structure behind the dome or mushroom structure in an attempt to create additional instability, a vortex, in the feed of the power nozzle. FIG. 2 illustrates an embodiment from U.S. Pat. No. 7,472,848 that has introduced a step at the exit of the power nozzle, introducing an additional recirculation or vortice in the jet's path creating an instability.

Both of these improvements have produced slightly better cold performing circuits but have some drawbacks. For example, U.S. Pat. No. 7,267,290 requires the circuit to be slightly longer and often this is not allowable within the available packaging space. Also, this configuration may be difficult to scale for low flow circuits. U.S. Pat. No. 7,472,848 has been the most widely adopted of the two, with minor improvements to cold performance but not to distribution. As can be noted, both of these patents describe changes to the circuit outside of the interaction region.

However, it also has been found that as the temperature of such liquids continues to decrease so as to cause their viscosity to increase (e.g., 25 centipoise), the performance of this type of oscillator can deteriorate to the point where it no longer provides a jet that is sufficiently oscillatory in nature to allow its spray to be distributed over an appreciable fan angle. This situation is especially problematic in windshield washer applications that utilize such fluidic oscillators.

Figure 5:
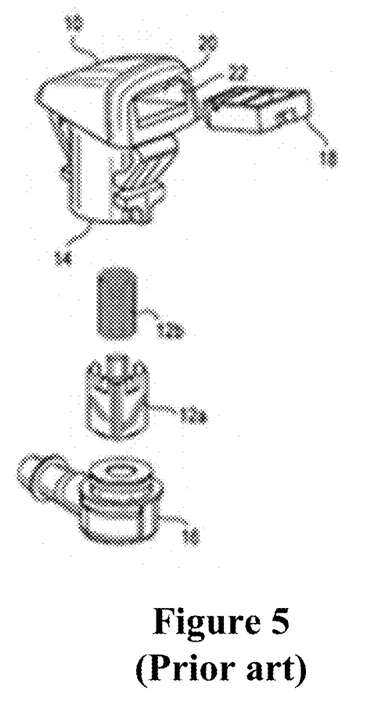
FIG. 5 is a perspective view of an exploded nozzle assembly and fluidic oscillator chip of the prior art.
Figure 6:
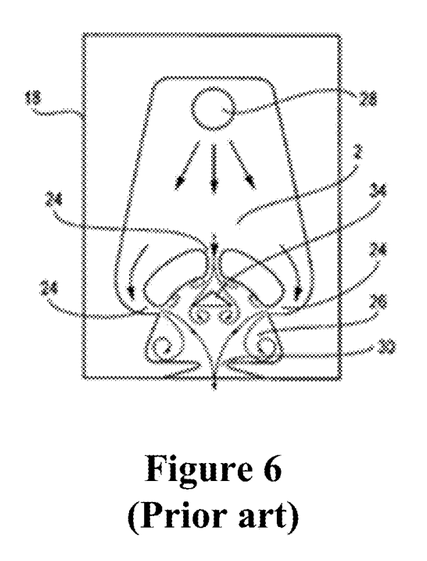
FIG. 6 is a front view of a fluidic oscillator circuit of the prior art with a three jet island configuration.

Interaction region modification attempts to improve distribution of the traditional mushroom circuit have led to U.S. Pat. No. 7,651,036, which is categorized as a "three jet island" circuit illustrated by FIG. 6. Here an additional jet and island is introduced to the interaction region to generate a number of additional vortices and instability. The three jet island circuit provides improved cold performance and some improvement to the evenness of the distribution. While this circuit works quite well, it does produce some manufacturing challenges. For example, as the flow rate of the circuit drops, the size of the internal smaller third island gets quite small and relatively fragile. The very act of assembling the fluidic oscillator chip, by pushing the chip into the slot (FIG. 5), can damage the smaller island 34 or even break it off. As a result, this three jet island circuit can only be reliably used for relatively high flow rate nozzles, as additional scrap can provide for unintended resulting spray geometries. Further, the addition of the third flow channel requires that all three flow channels or power nozzles 24 get smaller to keep the flow rates in specification, leading to a higher risk of clogging. This necessitates additional complexity in the filter region which has its own manufacturing and packaging challenges.

Despite much prior art relating to fluidic oscillators, there still exists a need for further technological improvements in the design of fluidic oscillators for use in colder environments. The present invention describes additional work that has been performed to improve the circuit, while eliminating some of the drawbacks described above.

SUMMARY

This disclosure relates to embodiments for a fluidic oscillator circuit for a nozzle assembly. In one embodiment, provided is a fluidic oscillator circuit comprising a geometry defined in a surface that includes at least one inlet configured to receive a flow of fluid. An interaction region may be positioned between the at least one inlet and an outlet, said interaction region is defined by a perimeter wall. At least one power nozzle may be configured to produce a jet of fluid received from the at least one inlet and circulated within the interaction region. An may be outlet in communication with the interaction region and be configured to dispense an oscillating spray of fluid in a desired spray pattern therefrom. An apex protrusion may be positioned along the perimeter wall of the interaction region and protrudes inwardly from the perimeter wall. The at least one inlet may include a geometry that allows for fluid communication with an opposite side of the surface in which the geometry is defined. The geometry may further include an elongated path from the at least one inlet to the power nozzle. The interaction region may include a dome or mushroom shaped region defined by the perimeter wall. The geometry may include a first inlet and a second inlet defined in the surface, the first inlet may be in communication with a first power nozzle and the second inlet may be in communication with a second power nozzle, the first power nozzle and second power nozzle are each configured to produce a jet of fluid received from the at least one inlet and circulated within the interaction region wherein the apex protrusion may be positioned between the first power nozzle and the second power nozzle along the perimeter wall of the interaction region. The apex protrusion may be positioned an equal distance from each of the first power nozzle and the second power nozzle. The apex protrusion is shaped to include an intersection of two rounded or curved perimeter wall of the interaction region that intersect at a point. The apex protrusion may be shaped to include an intersection of two rounded or curved perimeter surfaces of the interaction region that intersect at a point and said point is an equal distance from the first power nozzle and the second power nozzle positioned along the interaction region. The apex protrusion may be configured to direct or stabilize the location of a plurality of vortices formed by fluid jets from the at least one power nozzle within the interaction region for controlling a geometrical placement of the vortices therein, wherein the plurality of vortices includes a left vortex and a right vortex formed by fluid with an increased measure of viscosity due to operation in cold temperatures. The first inlet and the second inlet may communicate separately to the first power nozzle and the second power nozzle in which the first power nozzle and second power nozzle are not fed from a common plenum. The outlet may includes an asymmetrical or yawed angle configuration.

In an embodiment, the geometry may include a first inlet and a second inlet defined in the surface, the first inlet in communication with a first power nozzle and the second inlet is in communication with a second power nozzle, the first power nozzle and second power nozzle are each configured to produce a jet of fluid received from the at least one inlet and circulated within the interaction region. A set of finger like protuberances may be defined adjacent an exit of the first power nozzle and a set of finger like protuberances defined adjacent an exit of the second power nozzle, the finger like protuberances are defined along the perimeter wall of the interaction region.

In another embodiment, provided is a fluidic oscillator circuit for a nozzle assembly comprising a geometry defined in a surface that includes at least one inlet configured to receive a flow of fluid. An interaction region may be positioned between the at least one inlet and the outlet, said interaction region is defined by a perimeter wall. At least one power nozzle may be configured to produce a jet of fluid received from the at least one inlet and circulated within the interaction region. An outlet may be in communication with the interaction region that is configured to dispense an oscillating spray of fluid in a desired spray pattern therefrom. A set of finger like protuberances may be defined adjacent an exit of the power nozzle along the perimeter wall of the interaction region. The at least one inlet may includes a geometry that allows for fluid communication with an opposite side of the surface in which the geometry is defined. The geometry may further include an elongated path from the at least one inlet to the power nozzle. The interaction region may include a dome or mushroom shaped region defined by the perimeter wall. The geometry may include a first inlet and a second inlet defined in the surface, the first inlet in communication with a first power nozzle and the second inlet is in communication with a second power nozzle, the first power nozzle and second power nozzle are each configured to produce a jet of fluid received from the at least one inlet and circulated within the interaction region. An apex protrusion may be positioned between the first power nozzle and the second power nozzle along the perimeter wall of the interaction region. The geometry may include a first inlet and a second inlet defined in the surface, the first inlet may be in communication with a first power nozzle and the second inlet may be in communication with a second power nozzle, the first power nozzle and second power nozzle are each configured to produce a jet of fluid received from the at least one inlet and circulated within the interaction region. The first power nozzle may include a first finger like protuberance that extends from a first side of the exit of the first power nozzle and a second finger like protuberance that extends from a second side of the exit of the first power nozzle along the perimeter wall of the interaction region. The second power nozzle may include a first finger like protuberance that extends from a first side of the second power nozzle and a second finger like protuberance that extends from a second side of the second power nozzle along the perimeter wall of the interaction region. The finger like protuberances act to lengthen the power nozzle by extending into the interaction region and be configured to create jets of fluid therefrom that are configured to reduce likelihood of attachment to the perimeter wall of the interaction region. The first inlet and the second inlet may communicate separately to the first power nozzle and the second power nozzle along the surface in which the first power nozzle and second power nozzle are not fed from a common plenum. The outlet may include an asymmetrical or yawed angle configuration.

DESCRIPTION OF THE DRAWINGS

These, as well as other objects and advantages of this invention, will be more completely understood and appreciated by referring to the following more detailed description of the presently preferred exemplary embodiments of the invention in conjunction with the accompanying drawings, of which.

DETAILED DESCRIPTION

Reference will now be made in detail to exemplary embodiments of the present teachings, examples of which are illustrated in the accompanying drawings. It is to be understood that other embodiments may be utilized and structural and functional changes may be made without departing from the respective scope of the present teachings. Moreover, features of the various embodiments may be combined or altered without departing from the scope of the present teachings. As such, the following description is presented by way of illustration only and should not limit in any way the various alternatives and modifications that may be made to the illustrated embodiments and still be within the spirit and scope of the present teachings. In this disclosure, any identification of specific shapes, materials, techniques, arrangements, etc. are either related to a specific example presented or are merely a general description of such a shape, material, technique, arrangement, etc.

Provided are concepts that modify an interaction region of a fluidic oscillator circuit that are enhancements and are not described or taught by the prior art. FIGS. 8A-8D illustrate various geometries of a fluidic oscillator circuit 100 that may be defined within a chip to be inserted or otherwise attached to a nozzle assembly. The geometry of the fluidic oscillatory circuit may be defined in the surface of a chip or a surface within a nozzle device. The circuit and surface and/or nozzle device may be made from a rigid material including polymers or alloys that may be formed in any commercial manner including by molding, additive manufacturing, or other known methods.

In one embodiment, the fluidic oscillator circuit 100 includes at least one inlet 110 to receive a flow of fluid and an outlet 120 to dispense an oscillating spray of fluid in a desired spray pattern therefrom. An interaction region 130 may be placed between the inlet 110 and the outlet 120 to allow for a desired fluid communication therethrough. At least one power nozzle 140 may be in aligned about the interaction region 130 to produce a jet of fluid received from the inlet 110 and circulated within the interaction region 130. The particular geometries of each of the elements identified that make up the fluidic oscillator circuit 100 have been identified to manipulate the flow of fluid therein to produce a desired shape of an oscillating fluid spray. The inlet 110 may have a geometry that allows for fluid communication with the opposite side of the circuit and then an elongated path from the inlet 110 to the power nozzle 140.

Figure 8A:
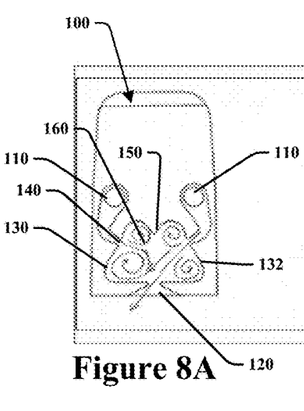
FIG. 8A is a schematic front view illustrating an interaction region and vortex locations for fluid flow of an oscillator circuit of the instant disclosure.
Figure 8B:
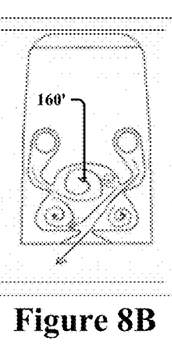
FIG. 8B is a schematic front view illustrating an interaction region and vortex locations for fluid flow of an oscillator circuit of the instant disclosure.
Figure 8C:
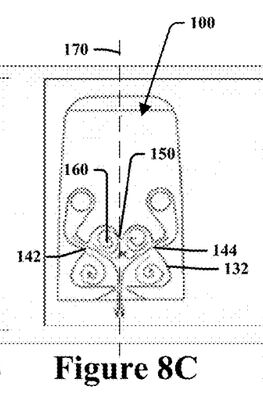
FIG. 8C is a schematic front view illustrating an interaction region and vortex locations for fluid flow of an oscillator circuit of the instant disclosure.

In one embodiment, the interaction region 130 includes a dome or mushroom shaped region defined by a perimeter wall or surface 132 that includes features to further manipulate the flow of fluid therein that is not known or taught by the prior art. In particular, the interaction region 130 may include an apex protrusion 150 that is positioned along the perimeter surface of the interaction region 130 and protrudes inwardly from the perimeter. The apex protrusion 150 may be positioned between two opposing power nozzles 140. The apex protrusion 150 may be positioned an equal distance from each of the two opposing power nozzles 140, such as first and second power nozzles 142, 144 as illustrated by FIG. 8C. The apex protrusion may be shaped to include an intersection of two rounded or curved perimeter surfaces of the interaction region 130 that intersect at a point. The intersection point may be an equal distance from the two opposing power nozzles 140 positioned along the interaction region 130. The intersection point may be aligned along a central axis 170 as described below.

The apex protrusion 150 may be configured to direct or stabilize the location of vortices 160 formed by fluid jets within the interaction region 130 for controlling a geometrical placement of the vortices therein. FIGS. 8A and 8C illustrate one possible, and effective, interaction region geometry that includes the apex protrusion 150. In this embodiment, there are separate inlets 110 that communicate separately to opposing power nozzles 140 in which the power nozzles are not fed from a common plenum. However, this disclosure contemplates that the addition of an apex protrusion 150 may be used in various types of fluidic oscillator circuit types and may also be employed with other types of fluidic oscillator circuits such as those that do utilize a common plenum for receiving fluid from an inlet.

Figure 7:
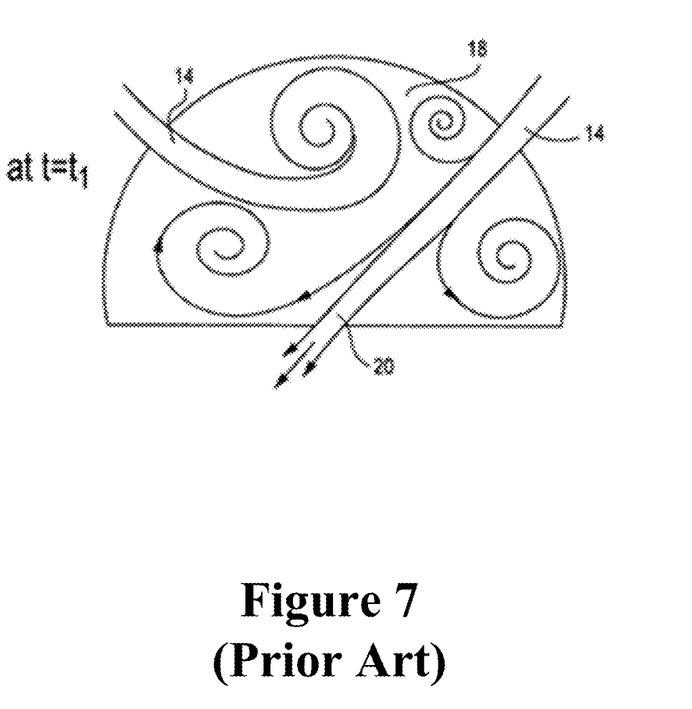
FIG. 7 is a schematic illustration of an interaction region and vortex locations for fluid in a fluidic oscillator circuit of the prior art as described in U.S. Pat. No. 6,253,782.
Figure 8D:
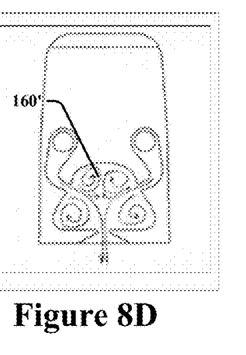
FIG. 8D is a schematic front view illustrating an interaction region and vortex locations for fluid flow of an oscillator circuit of the instant disclosure.

FIGS. 8A and 8C illustrate the apex protrusion 150 that is now added to the interaction region 130 to assist with forming left and right vortices 160 within the interaction region 130 when fluid is introduced therein from the power nozzles 140. FIG. 7 is provided to identify how fluid flow travels through a known type of interaction region without such an apex protrusion. Further, FIGS. 8B and 8D are provided for a frame of reference to illustrate how the flow of fluid may be manipulated by the addition of an apex protrusion 150 (illustrated by FIGS. 8A and 8C) to provide consistency in fluid flow. In particular, the newly disclosed interaction region 130 having the apex protrusion 150 is particularly beneficial when a fluid has an increased measure of viscosity due to operation in cold temperatures.

For example, the addition of the apex protrusion 150 allows for multiple upper vortices 160 along either side of the apex protrusion 150 during an oscillatory cycle of fluid flow as it is dispensed from the outlet 120. This consistency of vortex creation is particularly viewed from FIG. 8A as the spray of fluid from the outlet 120 is at an angle, compared to FIG. 8C as the oscillation of the spray of fluid from the outlet 120 is directed outwardly along an axis generally aligned along a central axis 170 of the circuit 100. Notably, the vortices 160 appear to have a generally consistent shape of fluid flow during the oscillation cycle as the fluid spray is generated along an entire fan spray shape.

Contrarily, FIGS. 8B and 8D illustrate inconsistent shaped vortices 160 wherein a large upper vortex and a small upper vortex exist in FIG. 8B as the spray of fluid from the outlet is at an angle. Further, FIG. 8D illustrates inconsistent shaped vortices 160 compared to the interaction region illustrated by FIG. 8B as the oscillation of the spray of fluid from the outlet 120 is directed outwardly along the axis generally aligned along a central axis 170 of the circuit.

A sample circuit was made with the geometry of the fluidic oscillator circuit 100 that includes the apex protrusion 150. It was tested to produce a nominal fan of about 53 degrees with a uniform spray pattern very similar to the three jet island circuit described above. Its flow rate was about 500 ml/min at 22 PSI. Cold performance was identified to be quite good in a solution of 50% methanol at 0 degrees F., with a cold fan of 35 degrees at about 5 PSI and 40 degrees at 6 PSI. Notably, a similar three jet island circuit would have a cold fan of about 30 degrees at 7 PSI, 32 degrees at 10 PSI and 40 degrees at 15 PSI. This embodiment provides a significant improvement over the prior art as during the oscillation cycle for a fluid during cold temperatures, the fan recovered much quicker, allowing for a larger nominal fan angle.

Figure 9A:
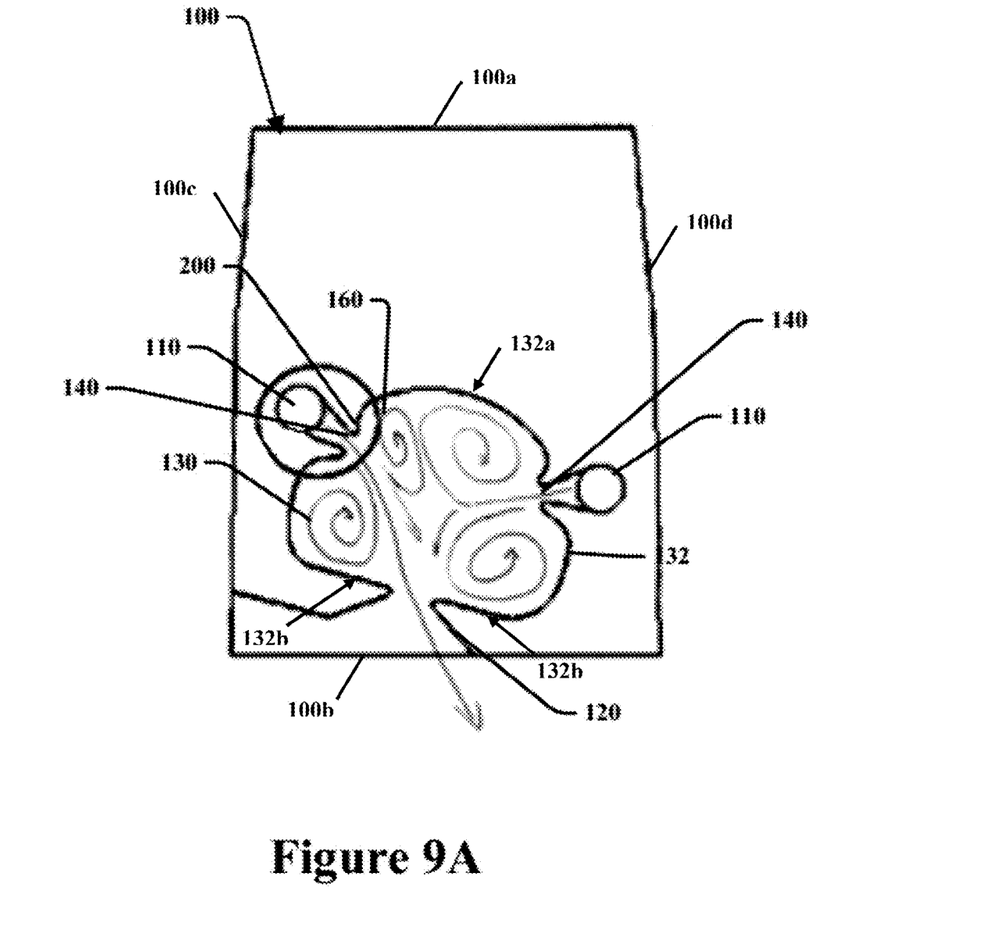
FIG. 9A is a front view of an embodiment of an oscillator circuit of the instant disclosure.

In another embodiment, as illustrated by FIG. 9A, provided is fluidic oscillator circuit 100 having much of the similar features as described above on a chip (similar to chip 18 in FIG. 5) having first and second opposing planar surfaces (with one of those surfaces being shown in FIG. 9A), but now also including an interaction region improvement that has been discovered. Circuit 100 includes upstream edge 100a, downstream edge 100b, and opposing edges 100c. 100d. A perimeter wall 132 includes an upstream portion 132a, a downstream portion 132b, which is divided into two discrete sections 132b by outlet 120 and with the downstream portions 132b being further characterized by straight edge portions immediately adjacent to the outlet 120. This embodiment includes a set of finger like protuberances 200 defined adjacent an exit of the power nozzle 140. The finger like protuberances 200 may extend from either side of the power nozzle 140 and act to lengthen the power nozzle without increasing the overall size of the fluidic oscillator circuit or chip. The addition of such finger like protuberances 200 sufficiently lengthens the lumen of the power nozzles 140 such that as fluid flows therethrough, jets are created that are less diffused (i.e., have less wall attachment). The produced jets having a reduced diffusion within the interactions provide for an increase of active/ unstable fluid under cold and/or high viscosity conditions. The finger like protuberances 200 may produce a stronger jet/flow of fluid in the middle of the interaction region 130. The resultant fluid spray from the outlet 120 was found to be a more uniform fan than the traditional mushroom shaped interaction region without such finger like protuberances. FIG. 9A shows one possible embodiment of this feature having an outlet 120 with an asymmetrical or yawed angle configuration and multiple inlets 110. However, this disclosure contemplates that the finger like protuberances 200 may be adapted for use in all types of fluidic oscillator circuits that are known to exist and this disclosure is not limited in this regard.

For comparison, the circuit which is a traditional style mushroom (the one on left hand side of FIG. 12A or 12B) has similar cold performance as the new circuit (FIG. 9A). However, because the spray pattern of the old mushroom circuit is heavy ended, it is not preferred for some applications such as rear automotive window spray. The three jet island circuit (FIG. 6) results in a desirable uniform fluid output spray fan but lacks in sufficient cold performance and results in even less desirable cold performance than the old mushroom circuit.

The finger like protuberance features 200 (FIG. 9A) extend the power nozzle, and in addition to the inlet 110 having a vertical feed (FIGS. 8A-8D, 9A and 9B), work to improve the cold performance of the fluidic oscillator circuit. The combination of vertical feed 110 and finger like protrusions 200 result in improved cold performance having an output fan spray that is less heavy ended. Further, the apex protrusion 150 (FIG. 12B) assists to makes the spray pattern more uniform without compromising the cold performance. It has been identified that a short distance between the vertical feed (inlet 110) and exit of the power nozzle 140 was found to help improve cold performance but adds more risks for manufacturing.

Figure 9B:
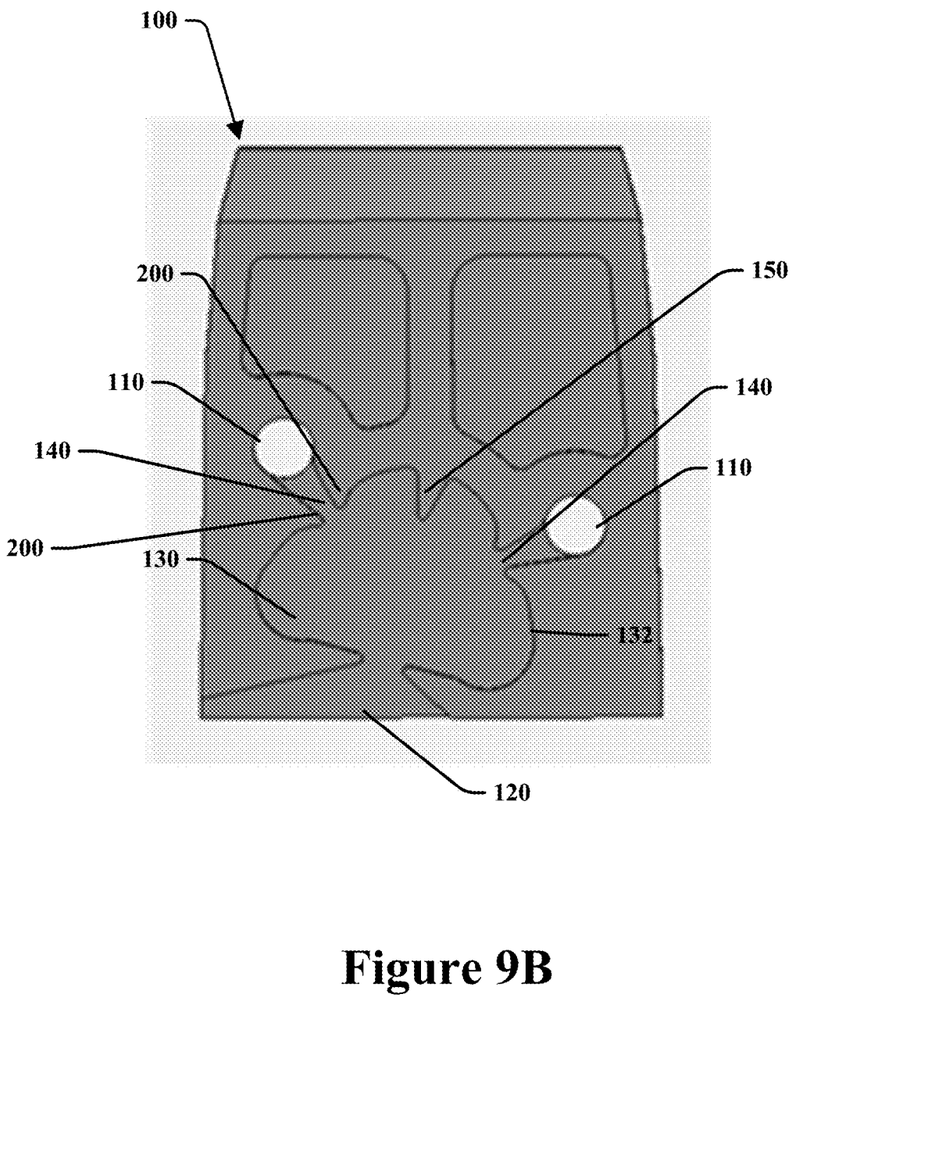
FIG. 9B is a front view of an embodiment of an oscillator circuit of the instant disclosure.

FIG. 9B illustrates another embodiment of the instant application that includes finger like protuberances 200 as well as an apex protrusion 150 having a throat exit outlet with an asymmetrical yaw angle. Such an angle may be about 15 degrees and this disclosure is not limited to such a geometry. This particular embodiment provides subtle improvements to the behavior of fluid in a nozzle assembly to allow for desired resultant fluid spray and cold performance that reduces "heavy ended" spray fan geometry.

Figure 4:
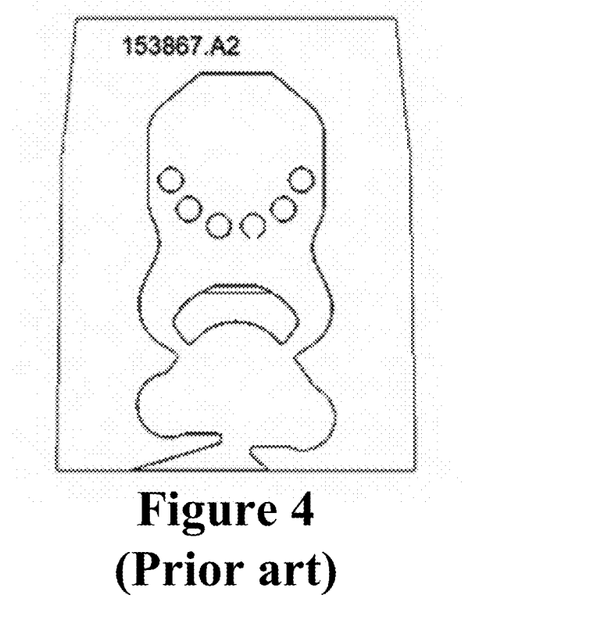
FIG. 4 is a front view of a fluidic oscillator circuit of the prior art with a yawed configuration.

A sample circuit with the finger like protuberances was found in normal (warm) temperatures to produce a fan of about 60 degrees with a flow rate of 735 ml/min at 18 PSI. The circuit was also found to exhibit cold performance at 0° F. of a methanol fluid, such as a solution of 50% methanol fluid, a fan of 40 degrees at 4 PSI and a fan of 50 degrees at 5 PSI in cold temperatures. The circuit was also found to exhibit cold performance at 0° F. of an ethanol fluid, such as a solution of 50% ethanol fluid, a fan of 40 degrees at 7 PSI and a fan of 50 degrees at 8 PSI. While FIG. 9 depicts a yawed spray circuit, it is equally applicable to non-yawed circuits. FIG. 4 shows a traditional prior art mushroom type fluidic oscillator circuit with a yawed configuration for comparison. The circuit of FIG. 4 includes a fan of 60 degrees and a flow rate of 810 ml/min at 18 PSI in normal (warm) temperatures while its methanol fluid cold performance exhibits a fan at 20 degrees at 20 PSI and 40 degrees at 30 PSI.

In this embodiment of the interaction region enhancement, the fluidic oscillator circuit displays an increase in cold temperature performance that exceeds similar mushroom circuits.

Figure 10:
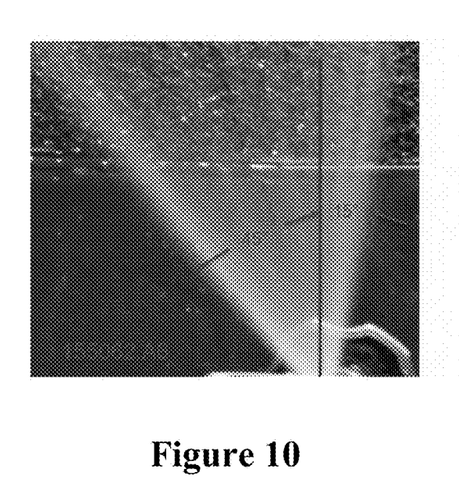
FIG. 10 is an image of a yawed spray from a fluid oscillator circuit of the instant disclosure.
Figure 11:
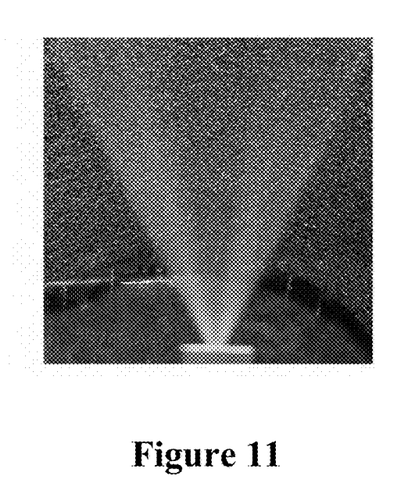
FIG. 11 is an image view of an existing spray from a fluid oscillator circuit of the prior art.

The following images describe the differences in spray distribution and droplet size between the new configuration (FIG. 10) versus a standard mushroom type fluidic oscillator circuit that is known in the art (FIG. 11). Here the spray fan produced by the fluidic oscillator circuit of FIG. 10 includes relatively larger droplet sizes having spray fan edges only being slightly heavy ended. In contrast, the traditional mushroom style fluidic oscillator illustrated by FIG. 11 produces a spray fan with relatively small droplet sizes with spray fan edges that a reconsidered to have significantly heavy edges.

Figure 12A:
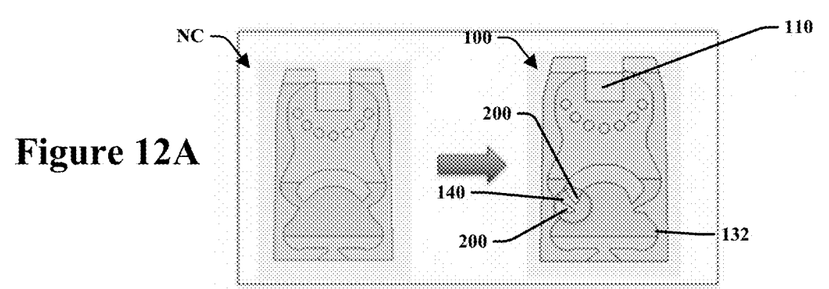
FIG. 12A is a front view of embodiments of fluid oscillator circuits of the present disclosure.
Figure 12B:
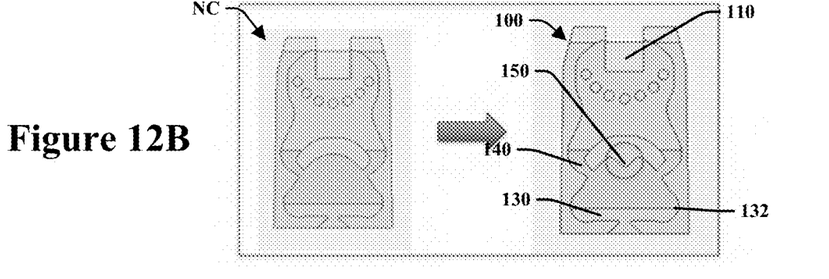
FIG. 12B is a front view of embodiments of fluid oscillator circuits of the present disclosure.

FIGS. 12A and 12B illustrate embodiments of the improved fluidic oscillator circuit designs disclosed by the instant application as they are distinguished from circuits known in the art. The known circuits NC are illustrated on the left and embodiments of the new fluidic oscillator circuits 100 are illustrated on the right. These fluidic oscillator designs have been identified to improve cold performance of the fluidic oscillator circuit to produce a higher velocity and produce a more uniform spray.

FIG. 12A illustrates an embodiment that includes a set of finger like protuberances 200 defined adjacent an exit of the power nozzle 140. The finger like protuberances 200 may extend from either side of the power nozzle 140 and act to lengthen the power nozzle without increasing the overall size of the fluidic oscillator circuit or chip. As distinguished from FIG. 9, FIG. 12A illustrates one possible embodiment of this feature having an outlet 120 with a symmetrical configuration and a single inlet 110. However, this disclosure contemplates that the finger like protuberances 200 may be adapted for use in all types of fluidic oscillator circuits that are known to exist and this disclosure is not limited in this regard.

FIG. 12B illustrates an embodiment that includes an apex protrusion 150 that extends into the interaction region 130 of the circuit. The apex protrusion 150 that is now added to the interaction region 130 assists with forming left and right vortices within the interaction region 130 when fluid is introduced therein from the power nozzles 140. In particular, the newly disclosed interaction region 130 having the apex protrusion 150 is particularly beneficial when a fluid has an increased measure of viscosity due to operation in cold temperatures.

Figure 13:
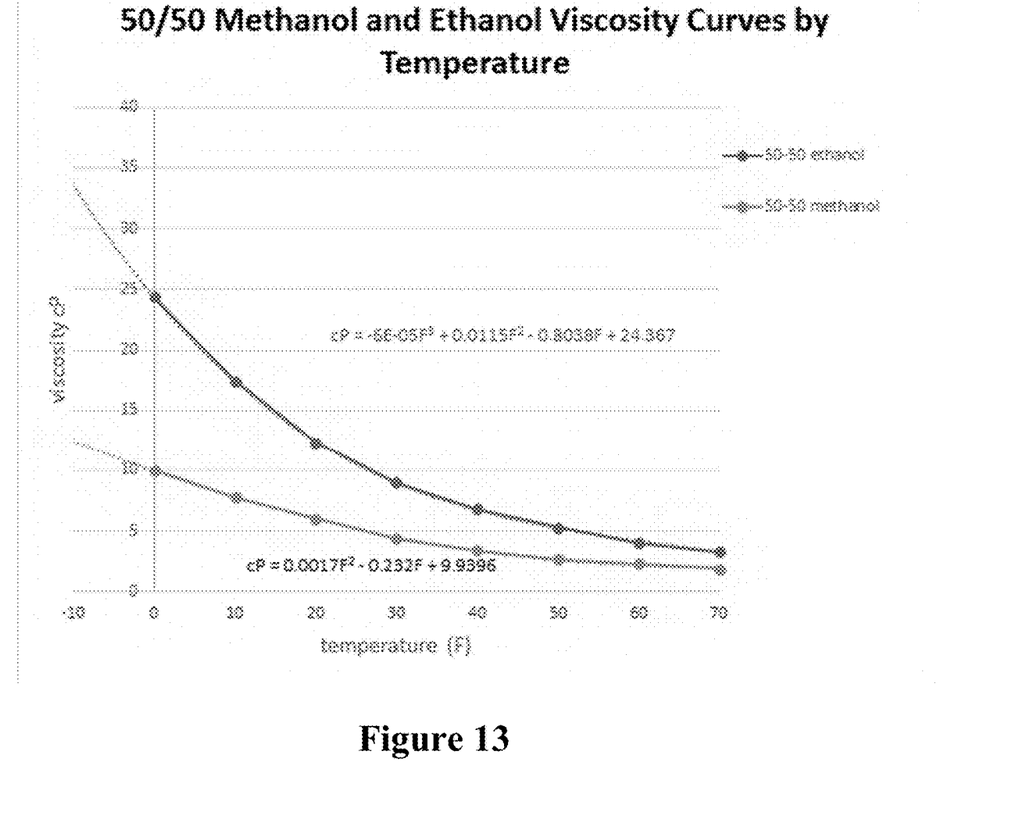
FIG. 13 is a table that illustrates viscosity versus temperature curves for methanol and ethanol fluids.

FIG. 13 is provided to illustrate that as the temperature of methanol and ethanol fluids drop, their viscosity increases, thus causing the need to develop improvements to sprays generated by fluidic oscillators for fluids having reduced temperatures and increased viscosities.

Although the embodiments of the present teachings have been illustrated in the accompanying drawings and described in the foregoing detailed description, it is to be understood that the present teachings are not to be limited to just the embodiments disclosed, but that the present teachings described herein are capable of numerous rearrangements, modifications and substitutions without departing from the scope of the claims hereafter. The claims as follows are intended to include all modifications and alterations insofar as they come within the scope of the claims or the equivalent thereof

Having thus described the invention, I claim:

1. A fluidic circuit for a nozzle assembly, the fluidic circuit comprising:

a circuit member defining an upper planar surface and a lower planar surface and having an upstream edge, a downstream edge, and two side edges;

at least one inlet passing through the circuit member to allow for fluid communication therethrough;

an interaction region formed on the lower planar surface so as to define an unobstructed interaction chamber that feeds into a single outlet;

wherein the interaction region is bounded by an upstream perimeter wall oriented with the upstream edge, two downstream perimeter wall sections oriented with the downstream edge, and opposing power nozzles defining a first power nozzle and a second power nozzle, wherein first and second pairs of elongated protuberances are formed on opposing side edges of the interaction chamber, with each pair of the elongated protuberances extending inwardly toward a middle portion of interaction chamber, thereby elongating a flow path for each power nozzle and imparting a C-shape on the upstream perimeter wall and, on each of the two downstream perimeter wall sections, mirror-image C-shapes are formed, each connected to a straight edge wall section on either side of the single outlet, wherein the first pair of elongated protuberances define the first power nozzles and the second pair of elongated protuberances define the second power nozzles, wherein each of the power nozzles is fluidically connected to the at least one inlet and configured eject a jet toward the middle portion, and wherein the single outlet is: i) defined by opposing terminal edges of each of the two downstream perimeter wall sections, and ii) positioned along the downstream edge; and wherein fluid provided to the fluidic circuit only comes into contact with at least one inlet, the interaction chamber, and the single outlet, thereby dispensing an oscillating fan spray from the single outlet in a plane coinciding with the lower planar surface.

2. The fluidic circuit of claim 1, wherein the oscillating fan spray has an angle in the plane that is at least 35 degrees wide and up to 60 degrees wide.

3. The fluidic circuit of claim 1, wherein the respective inlets of each of the power nozzles are fed from a common plenum.

4. The fluidic circuit of claim 1, wherein the single outlet has an asymmetrical configuration or is positioned at a yawed angle relative to the downstream edge.

5. The fluidic circuit of claim 4, wherein the upstream perimeter wall includes an apex protrusion extending toward the middle portion.

6. The fluidic circuit of claim 5, wherein the apex protrusion is positioned an equal distance from the power nozzles defined by the first and second pairs of elongated protuberances.

7. The fluidic circuit of claim 5, wherein the power nozzles produce corresponding fluid jets within the interaction region and wherein the apex protrusion is configured on the upstream perimeter wall between the opposing terminal edges at a position selected to direct or stabilize vortices of the corresponding fluid jets within the interaction region.

8. The fluidic circuit of claim 7, wherein first and second inlets are provided and wherein the first inlet feeds only the first power nozzle and the second inlet feeds only the second power nozzle.

* * * * *